US011066093B2

(12) United States Patent
Buzzard et al.

(10) Patent No.: US 11,066,093 B2
(45) Date of Patent: Jul. 20, 2021

(54) STEERING COLUMN ASSEMBLY HAVING A LOCKING ASSEMBLY (71) Applicant: STEERING SOLUTIONS IP HOLDING CORPORATION, Saginaw, MI (US)

(72) Inventors: Donald A. Buzzard, Saginaw, MI (US); Michael P. Anspaugh, Bay City, MI (US); Zachery P. Schultz, Munger, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 167 days.

(21) Appl. No.: 16/401,806

(22) Filed: May 2, 2019

(65) Prior Publication Data

US 2019/0337552 A1 Nov. 7, 2019

Related U.S. Application Data (60) Provisional application No. 62/667,125, filed on May 4, 2018.

(51) Int. Cl.
*B62D 1/184* (2006.01)
*B62D 1/187* (2006.01)
*B62D 1/185* (2006.01)

(52) U.S. Cl.
CPC ............ *B62D 1/184* (2013.01); *B62D 1/187* (2013.01); *B62D 1/185* (2013.01)

(58) Field of Classification Search
CPC ........ B62D 1/184; B62D 1/183; B62D 1/181; B62D 1/185; B62D 1/187
See application file for complete search history.

(56) References Cited

U.S. PATENT DOCUMENTS

| 6,659,504 | B2* | 12/2003 | Riefe ..................... | B62D 1/184 |
| | | | | 280/775 |
| 9,446,781 | B2* | 9/2016 | Tanaka .................. | B62D 1/184 |
| 9,758,188 | B1* | 9/2017 | Buzzard ................ | B62D 1/184 |
| 10,494,011 | B2* | 12/2019 | Anspaugh ............. | B62D 1/192 |
| 10,611,397 | B2* | 4/2020 | Sugiura ................. | B62D 1/189 |
| 10,717,457 | B2* | 7/2020 | Dubay .................... | B62D 1/19 |
| 2004/0035238 | A1* | 2/2004 | Jolley ..................... | B62D 1/184 |
| | | | | 74/493 |
| 2013/0174684 | A1* | 7/2013 | Burns .................... | B62D 1/184 |
| | | | | 74/493 |
| 2017/0066468 | A1* | 3/2017 | Tomiyama ............ | B62D 1/184 |
| 2017/0282957 | A1* | 10/2017 | Matsuno ................ | B62D 1/187 |
| 2018/0079443 | A1* | 3/2018 | Anspaugh ............. | B62D 1/184 |

\* cited by examiner

*Primary Examiner* — Paul N Dickerson
*Assistant Examiner* — Caitlin A Miller
(74) *Attorney, Agent, or Firm* — Dickinson Wright PLLC (57) ABSTRACT

A steering column assembly includes a jacket assembly and a locking assembly. The jacket assembly is operatively connected to a mounting bracket. The jacket assembly is locking assembly operatively connected to at least one of the jacket assembly and the mounting bracket. The locking assembly includes a first member defining a first plurality of engagement members and a second member defining a second plurality of engagement members. Responsive to the locking assembly moving between an unlock position and a lock position, at least one of the first member and the second member moves along an arcuate path relative to the other of at least one of the first member and the second member.

15 Claims, 14 Drawing Sheets

STEERING COLUMN ASSEMBLY HAVING A LOCKING ASSEMBLY

CROSS-REFERENCES TO RELATED APPLICATIONS

This patent application claims priority to U.S. Provisional Patent Application Ser. No. 62/667,125, filed May 4, 2018 which is incorporated herein by reference in its entirety.

BACKGROUND

A vehicle may be provided with a steering column assembly that is telescopically and/or tilt adjustable. The steering column assembly is provided with a feature or a mechanism that maintains the steering column assembly in a fixed position for driving. The feature or mechanism incorporates locking hardware that restricts each degree of freedom of the steering column assembly.

SUMMARY

According to an embodiment of the present disclosure, a steering column assembly is provided. The steering column assembly includes a mounting bracket and a jacket assembly operatively connected to the mounting bracket. The jacket assembly is movable relative to a steering column axis. Also included is a locking assembly operatively connected to at least one of the jacket assembly and the mounting bracket. The locking assembly includes a first member defining a first plurality of teeth and a second member defining a second plurality of teeth. At least one of the first member and the second member are pivotable along an arcuate path relative to the other of the first member and the second member during movement of the locking assembly from an unlock position to a lock position. Further included is a first biasing member that disengages the first member from the second member and manages a compliance axis between the teeth of the first member and teeth of the second member.

According to another embodiment of the present disclosure, a steering column assembly includes includes a mounting bracket and a jacket assembly operatively connected to the mounting bracket. The jacket assembly is movable relative to a steering column axis. Also included is a locking assembly operatively connected to at least one of the jacket assembly and the mounting bracket. The locking assembly includes a first member defining a first plurality of teeth and a second member defining a second plurality of teeth. At least one of the first member and the second member are pivotable along an arcuate path relative to the other of the first member and the second member during movement of the locking assembly from an unlock position to a lock position. Further included is a first biasing member that disengages the first member from the second member and manages a compliance axis between the teeth of the first member and teeth of the second member. Also included is a spring loaded device that extends at least partially through the first member and the second member.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
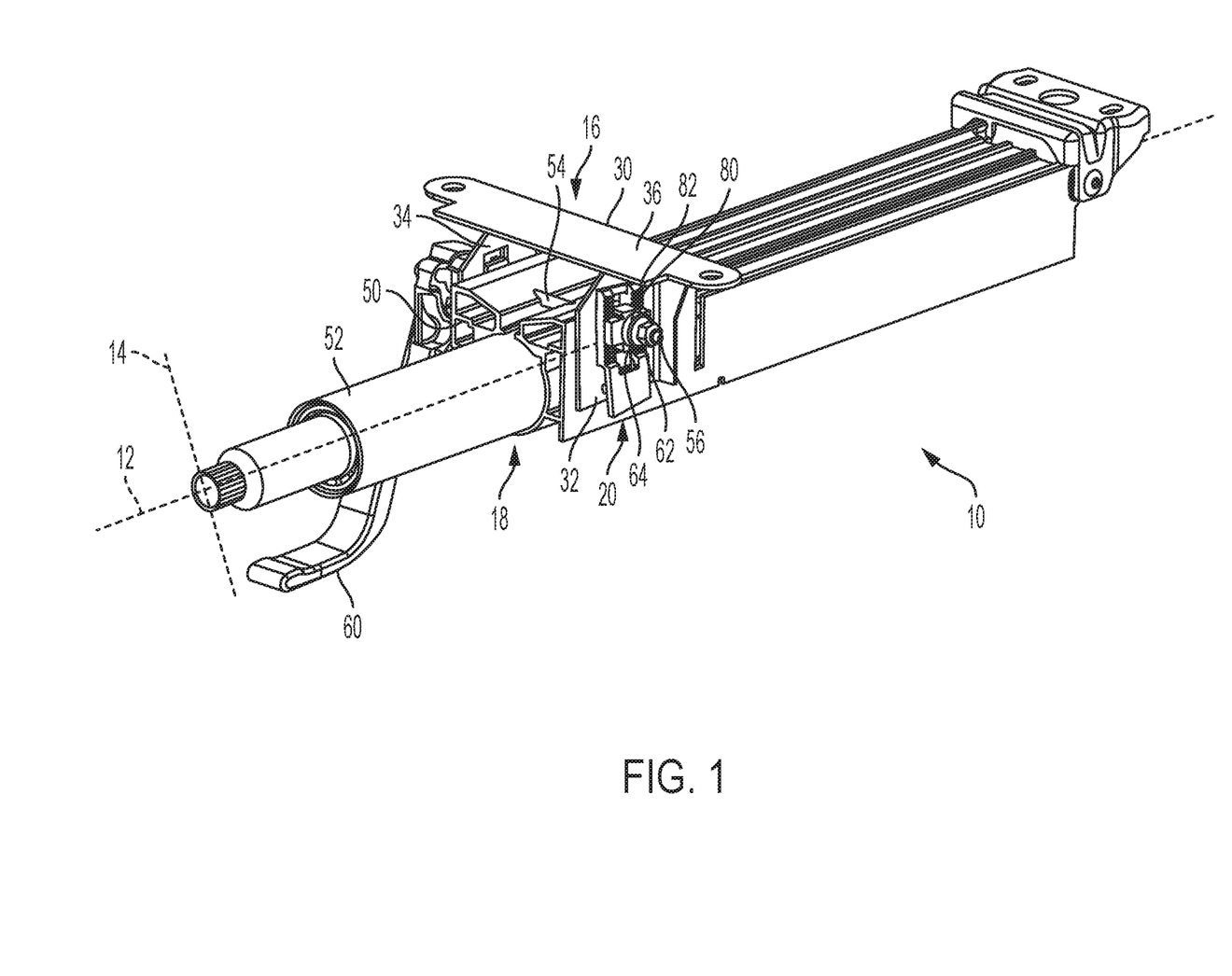
FIG. 1 is a perspective view of a steering column assembly.
Figure 2:
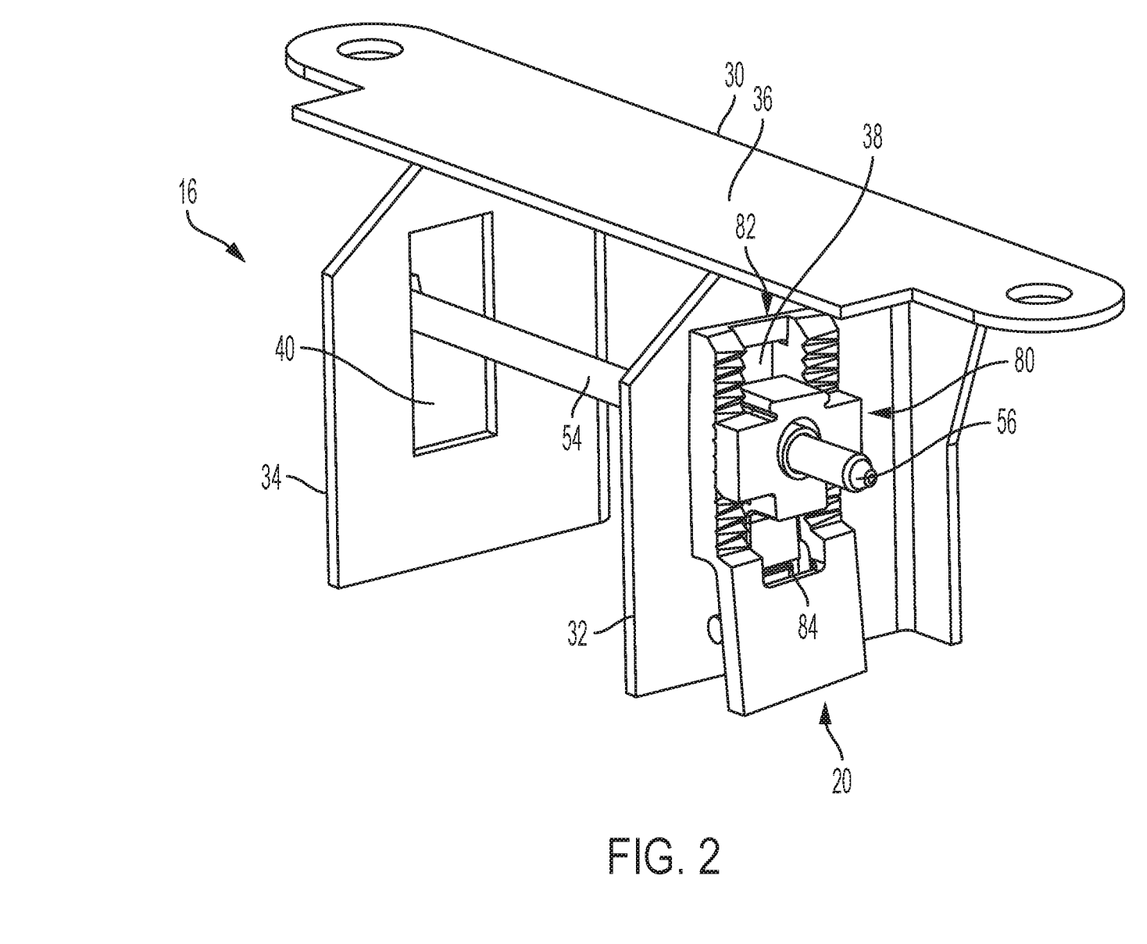
FIG. 2 is a partial perspective view of a portion of the steering column assembly and a locking assembly.

Referring to FIGS. 1 and 2, a steering column assembly 10 is shown. The steering column assembly 10 extends along a steering column axis 12. The steering column assembly 10 is an adjustable steering column assembly wherein at least a portion of the steering column assembly 10 is telescopically movable relative to the steering column axis 12. For example, the steering column assembly 10 translates along the steering column axis 12 and/or tilts, pivots, and rake adjusts relative to a pivot axis 14. The steering column assembly 10 includes a mounting bracket 16, a jacket assembly 18, and a locking assembly 20.

The mounting bracket 16 operatively connects the jacket assembly 18 to a vehicle structure (not shown). The mounting bracket 16 is configured to facilitate the adjustment of the pitch, tilt, or rake of the jacket assembly 18. The mounting bracket 16 includes a mounting bracket body 30, a first arm 32, and a second arm 34. The mounting bracket body 30 includes a generally planar portion 36 that is disposed generally parallel to the steering column axis 12. The first arm 32 extends from and is disposed generally perpendicular to the mounting bracket body 30. The first arm 32 defines a first opening 38 that extends at least partially through the first arm 32. The second arm 34 is spaced apart from and is disposed generally parallel to the first arm 32. The second arm 34 extends from and is disposed generally perpendicular to the mounting bracket body 30. The second arm 34 defines a second opening 40 that extends at least partially through the second arm 34.

The jacket assembly 18 is operatively connected to the mounting bracket 16. The jacket assembly 18 is disposed between the first arm 32 and the second arm 34 of the mounting bracket 16. The jacket assembly 18 is movable along the steering column axis 12 and is movable relative to the mounting bracket 16. The jacket assembly 18 includes a lower jacket assembly 50 and an upper jacket assembly 52.

The lower jacket assembly 50 is connected to the mounting bracket 16 by a rake bolt 54 that extends through at least one of the first opening 38 of the first arm 32, the second opening 40 of the second arm 34 of the mounting bracket 16, and the locking assembly 20.

The upper jacket assembly 52 is at least partially received within the lower jacket assembly 50. The upper jacket assembly 52 is translatable along the steering column axis 12 to telescopically adjust a position of a steering wheel (not shown) coupled to the upper jacket assembly 52.

The combination of the lower jacket assembly 50 and the upper jacket assembly 52 is pivotable, tiltable, or rake adjustable relative to the pivot axis 14 to perform a rake or pitch adjustment of the steering wheel (not shown) coupled to the upper jacket assembly 52.

As shown in FIG. 1, an adjustment lever 60 is pivotally connected to at least one of the mounting bracket 16, the jacket assembly 18, and the locking assembly 20. The adjustment lever 60 is pivotally connected to these structures by the rake bolt 54. The rake bolt 54 has a rake bolt head 56, the rake bolt head 56 protruding out from the locking assembly 20 and being secured by a fastening bolt 62 and a washer 64.

The adjustment lever 60 is movable between a lock position 70 (See FIGS. 7-9 and 14) and an unlock position 72 (See FIGS. 10-13) by an operator of a vehicle (not shown). The adjustment lever 60 moves between the lock position 70 and the unlock position 72 about an axis that extends through the rake bolt 54. The axis is disposed substantially transverse to the steering column axis 12 and substantially parallel to the pivot axis 14. The operator of the vehicle is able to move the adjustment lever 60 from the lock position 70 towards the unlock position 72 to adjust a position of the steering wheel (not shown) connected to the upper jacket assembly 52. The lock position 70 corresponds to a position of the locking assembly 20 that inhibits telescope or rake adjustment of the steering column assembly 10. The unlock position 72 corresponds to a position of the locking assembly 20 that facilitates or enables telescope or rake adjustment of the steering column assembly 10.

The locking assembly 20 is operatively connected to at least one of the mounting bracket 16 and the jacket assembly 18. The locking assembly 20 is arranged as a positive locking assembly for rake and telescope adjustment of the steering column assembly 10. The locking assembly 20 is arranged to lock or restrict the jacket assembly 18 in a fixed position about the pivot axis 14. The locking assembly 20 is also configured to inhibit movement of the upper jacket assembly 52 relative to the lower jacket assembly 50 and/or movement of the jacket assembly 18 relative to the mounting bracket 16 to maintain a position of the steering wheel (not shown) stable for driving.

The locking assembly 20 is arranged to transition between the unlocked position 72 and the locked position 70, responsive to movement of the adjustment lever 60. In some designs of locking mechanisms that incorporate locking teeth or locking members, the transition from the unlocked position 72 to the locked position 70 may become interrupted when the peak of one tooth collides with the peak of an opposing tooth, in turn inhibiting the steering column from becoming fully locked. The locking assembly 20 of the present disclosure avoids the "tooth on tooth" stall event, allowing the steering column assembly 10 to lock in position without obstruction.

Figure 3:
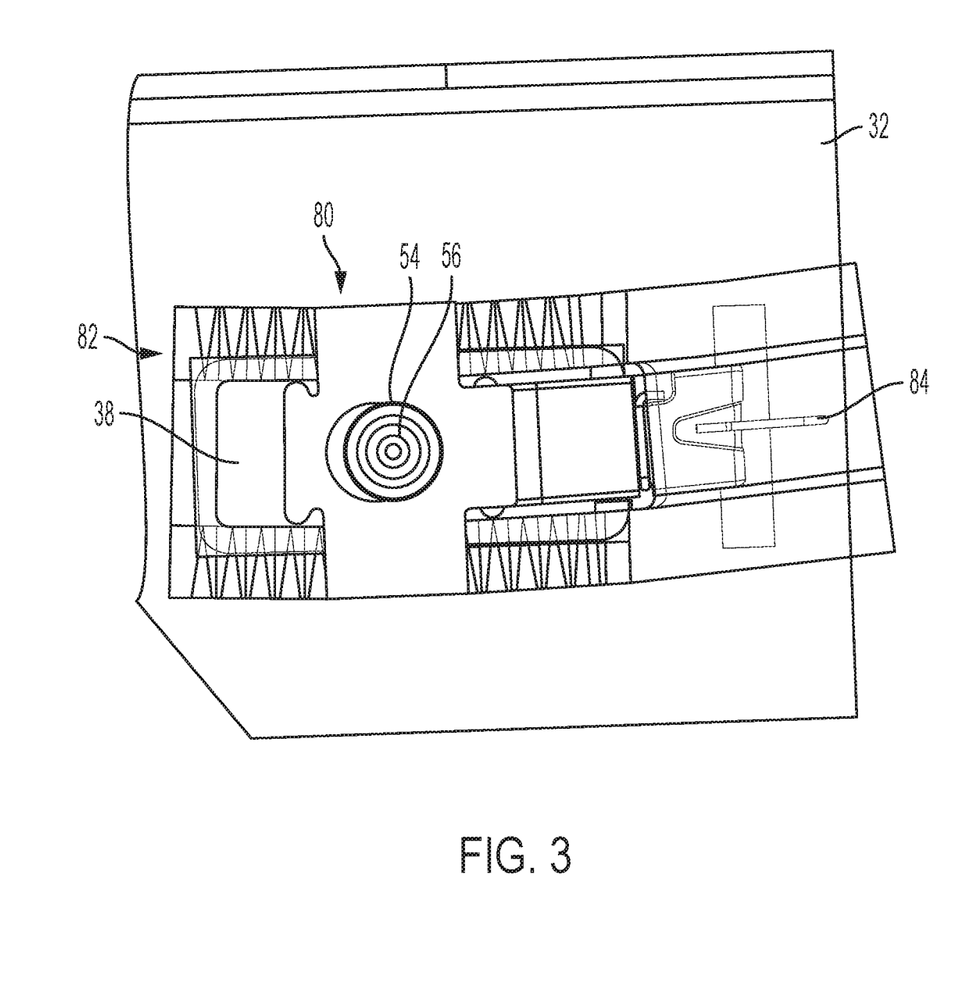
FIG. 3 is an elevational view of the partial perspective view of the portion of the steering column assembly and the locking assembly.

Referring to FIGS. 2 and 3, the locking assembly 20 is disposed on the first arm 32 of the mounting bracket 16 and at least partially extends into the first opening 38 of the first arm 32 of the mounting bracket 16 in the illustrated embodiment, but it is to be appreciated that the locking assembly 20 may be disposed on the second arm 34 in other embodiments. The locking assembly includes a first member 80, a second member 82, and a first biasing member 84.

Figure 4:
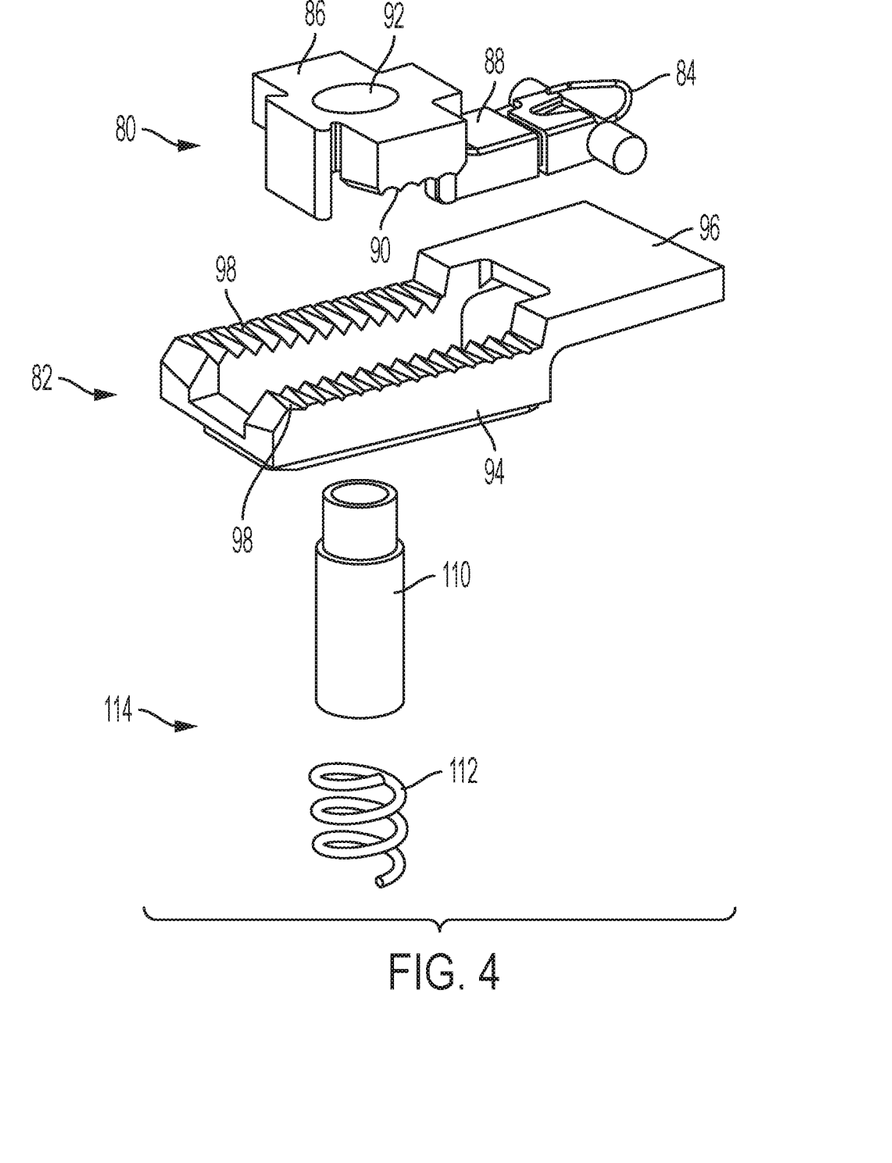
FIG. 4 is a disassembled view of the locking assembly.
Figure 5:
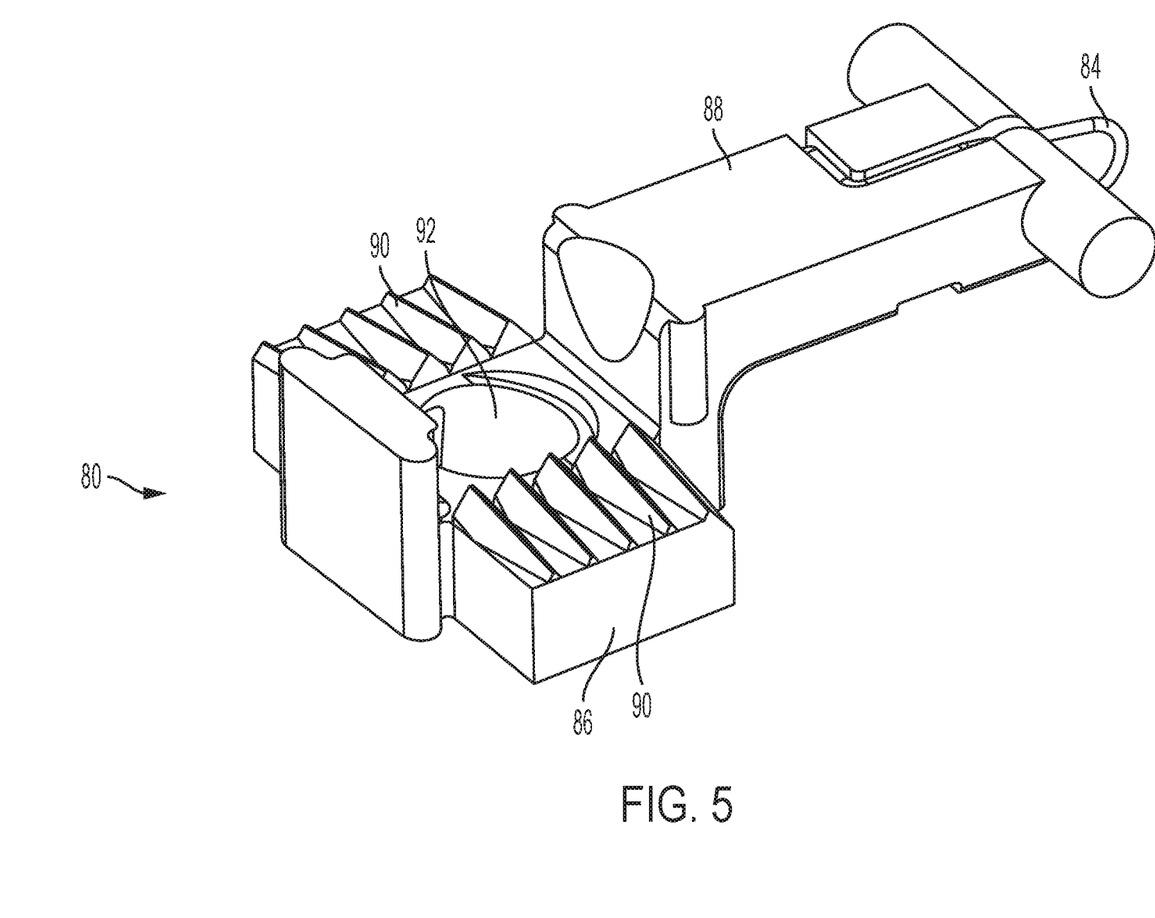
FIG. 5 is a perspective view of a portion of the locking assembly.

Referring to FIGS. 4 and 5, the first member 80 includes a first member first portion 86 and a first member second portion 88. The first member first portion 86 defines a first plurality of teeth 90 and a first member opening 92 through which the rake bolt 64 (See FIG. 2) passes through. The first member second portion 88 extends from the first member first portion 86. The first biasing member 84 is disposed about or operatively connected to the first member second portion 88. The first biasing member 84 may extend into a portion of the first member second portion 88.

The second member 82 includes a second member first portion 94 and a second member second portion 96. The second member first portion 94 defines a second plurality of teeth 98. The second plurality of teeth 98 of the second member 82 are disposed in an opposing relationship with the first plurality of teeth 90 of the first member 80 such that the second plurality teeth 98 of the second member 82 selectively engage the first plurality of teeth 90 of the first member 80. The second member second portion 96 extends from the second member first portion 94. The first member 80 extends into the second member second portion 96.

A disengagement member 110 extends through the first member 80 and the second member 82. A second biasing member 112 is operatively connected to the disengagement member 110, such that the combination of the disengagement member 110 of the second biasing member 112 form a spring loaded device 114. In the illustrated embodiment the device 114 is a coil spring.

Figure 6:
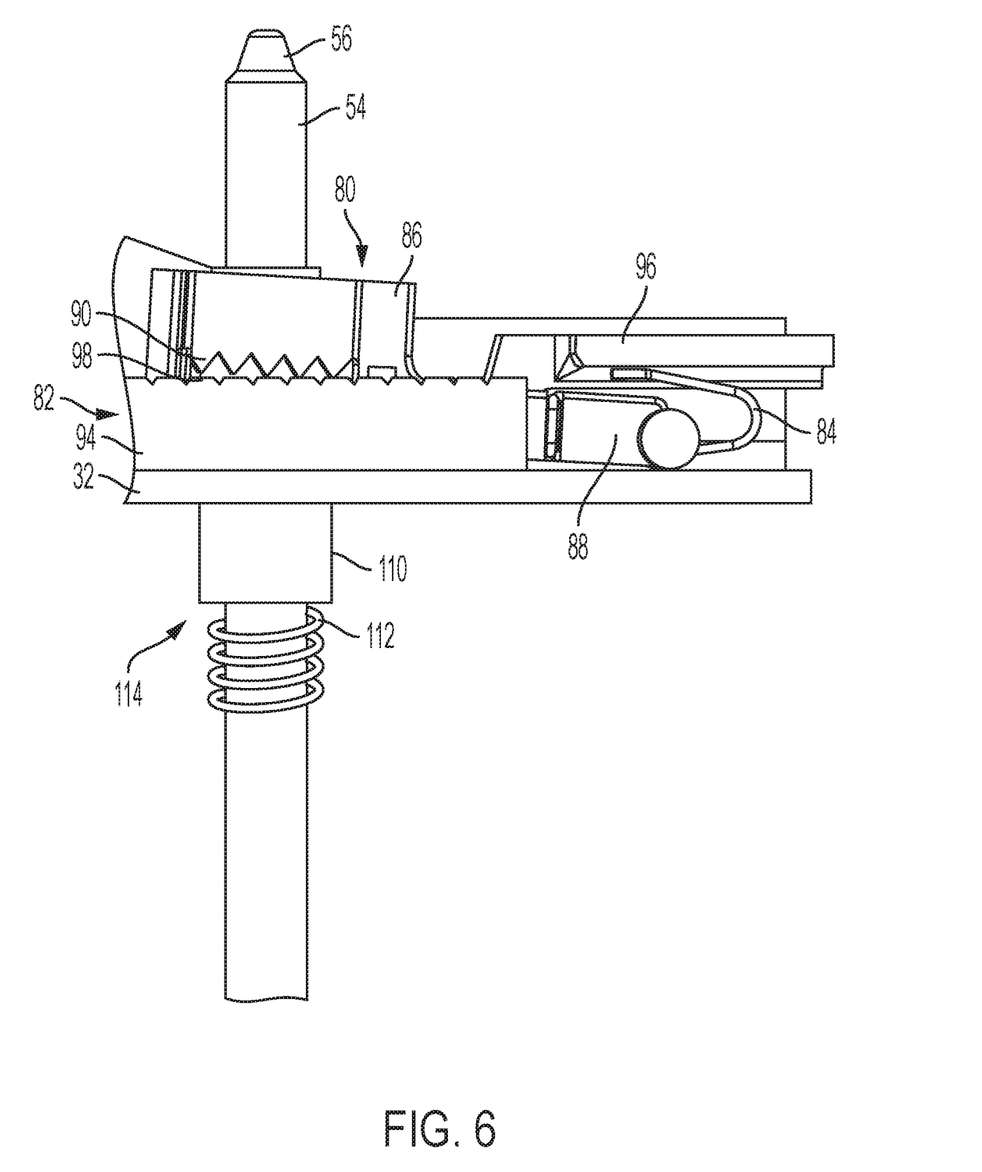
FIG. 6 is a partial cross-sectional view of the steering column assembly.
Figure 7:
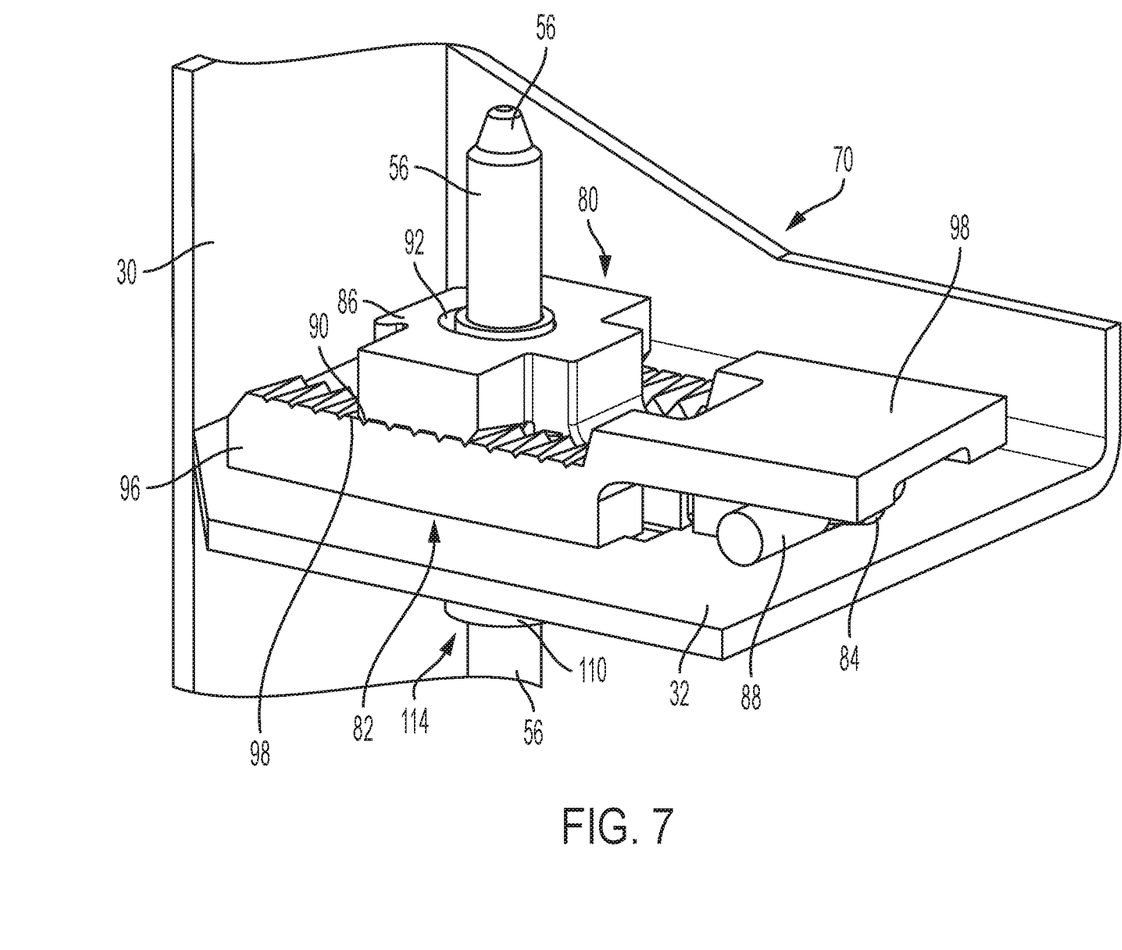
FIGS. 7-14 are perspective views of the locking assembly moving between an unlock position and a lock position.
Figure 8:
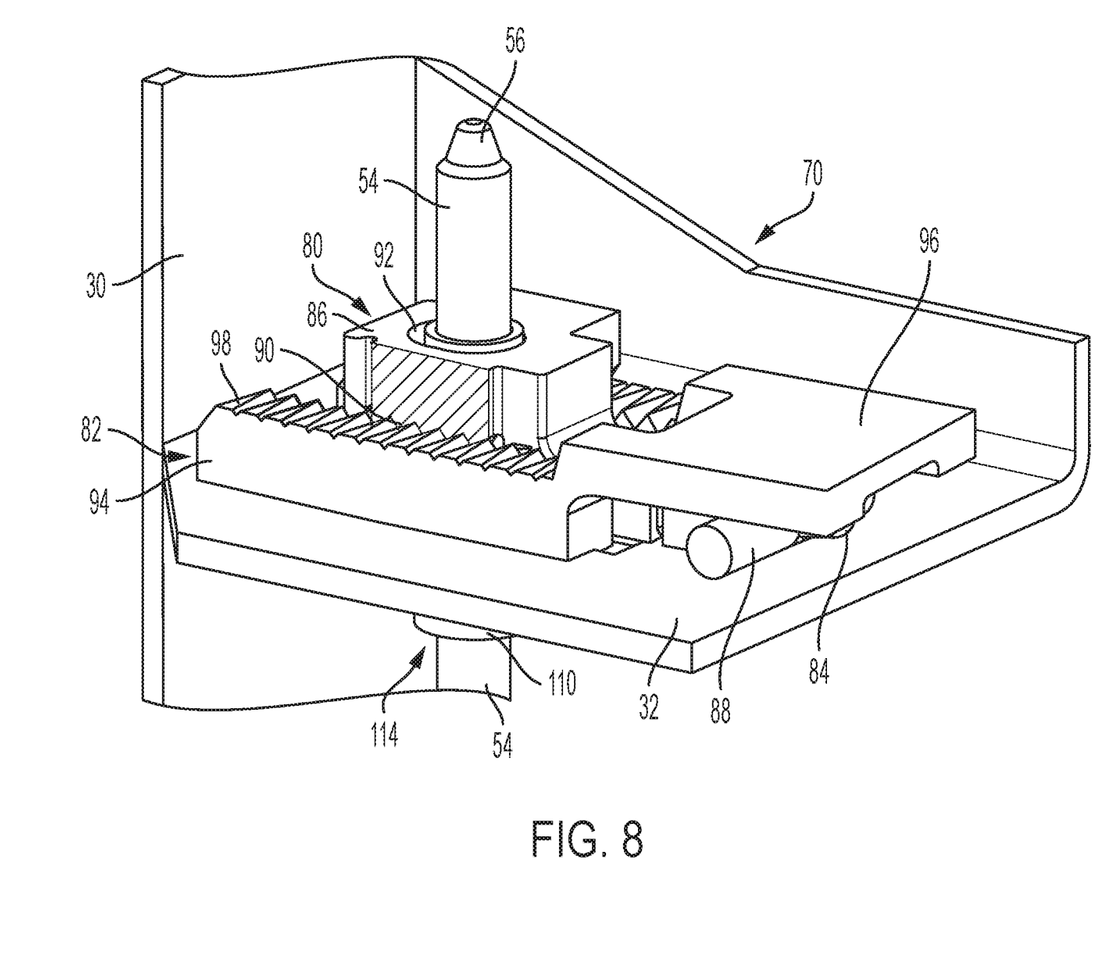
Figure 9:
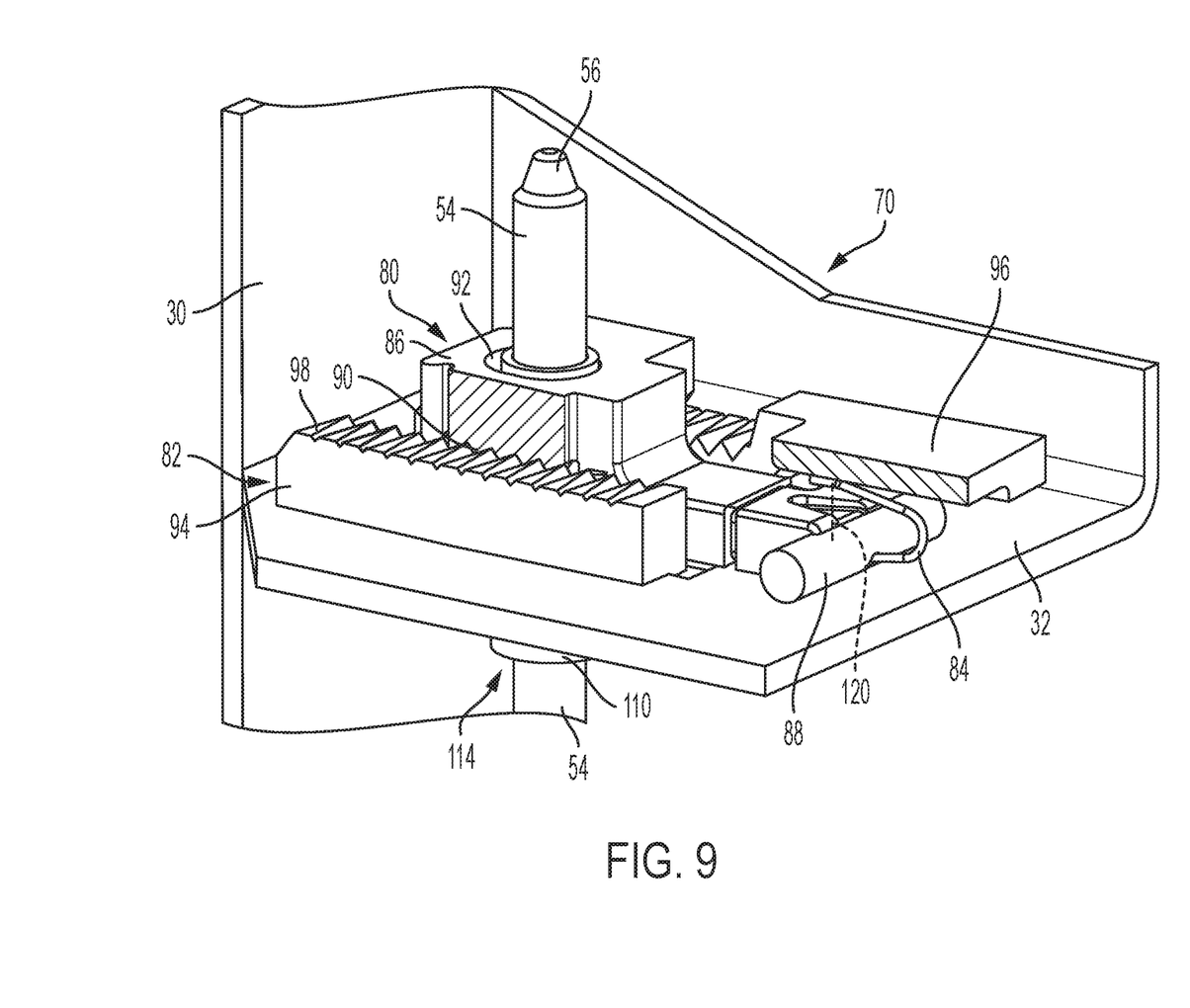
Figure 10:
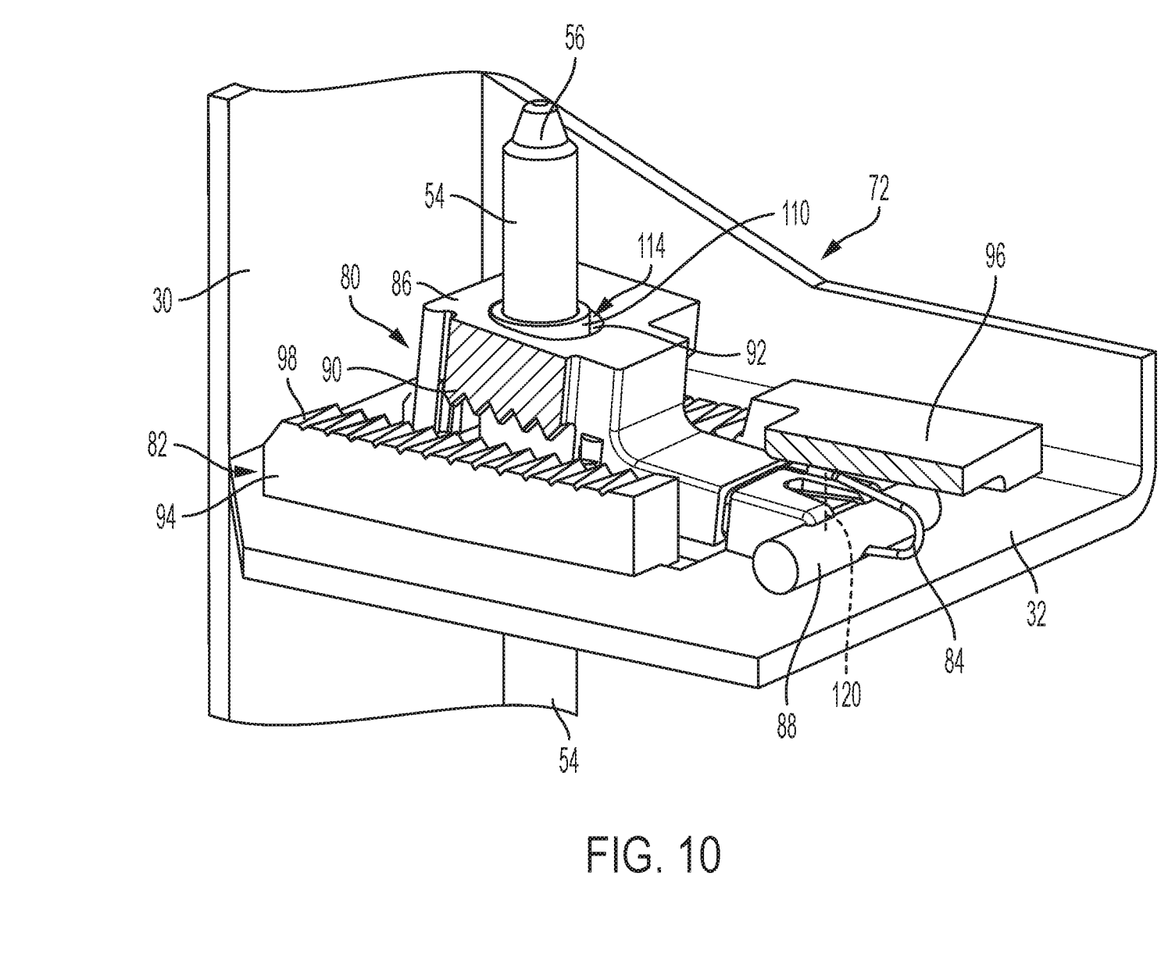
Figure 11:
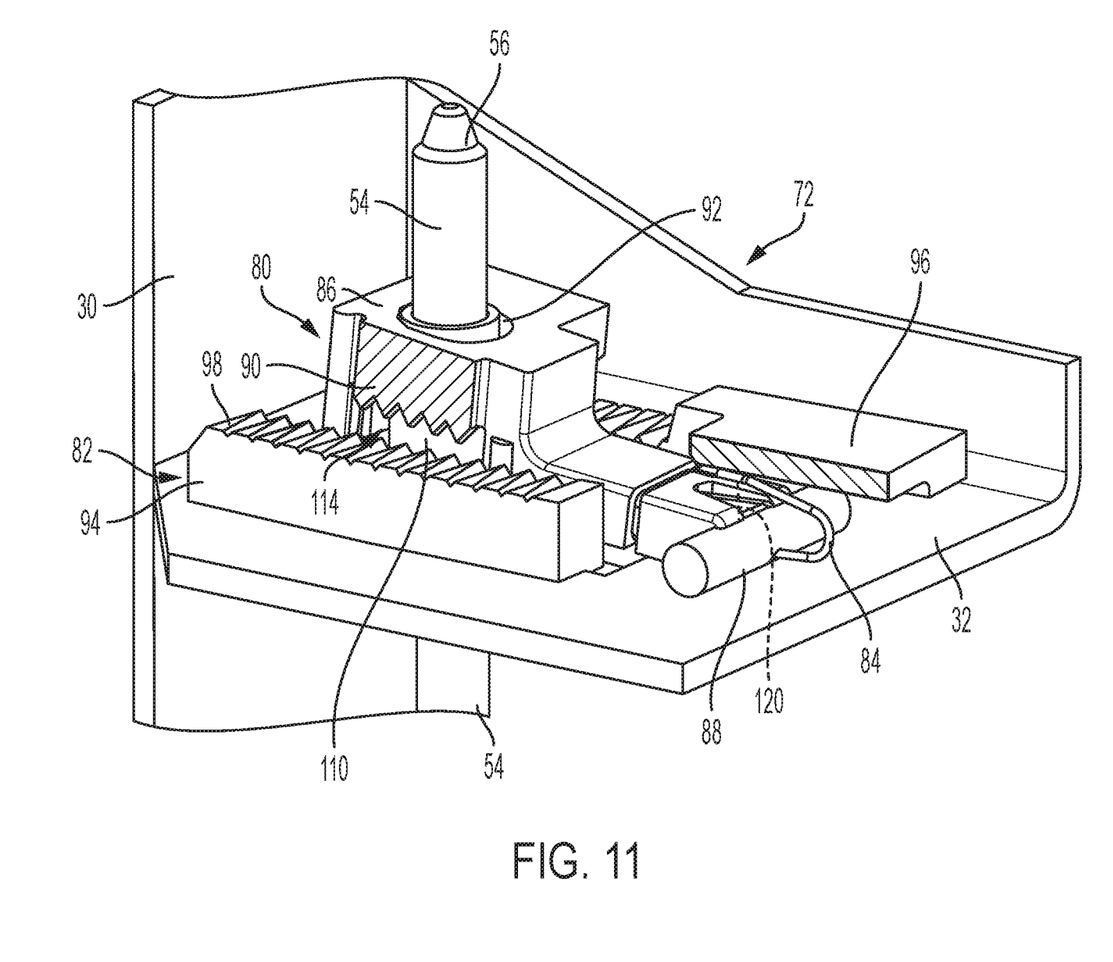
Figure 12:
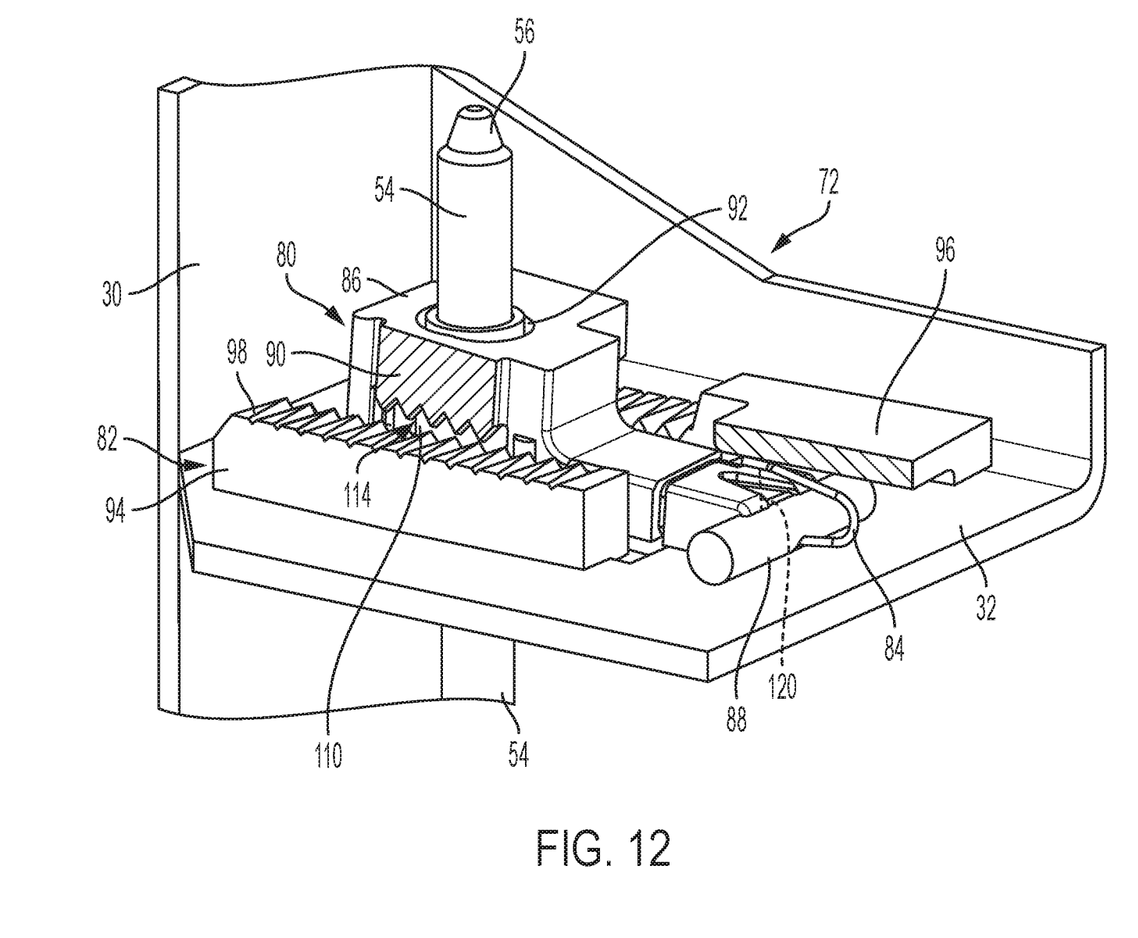
Figure 13:
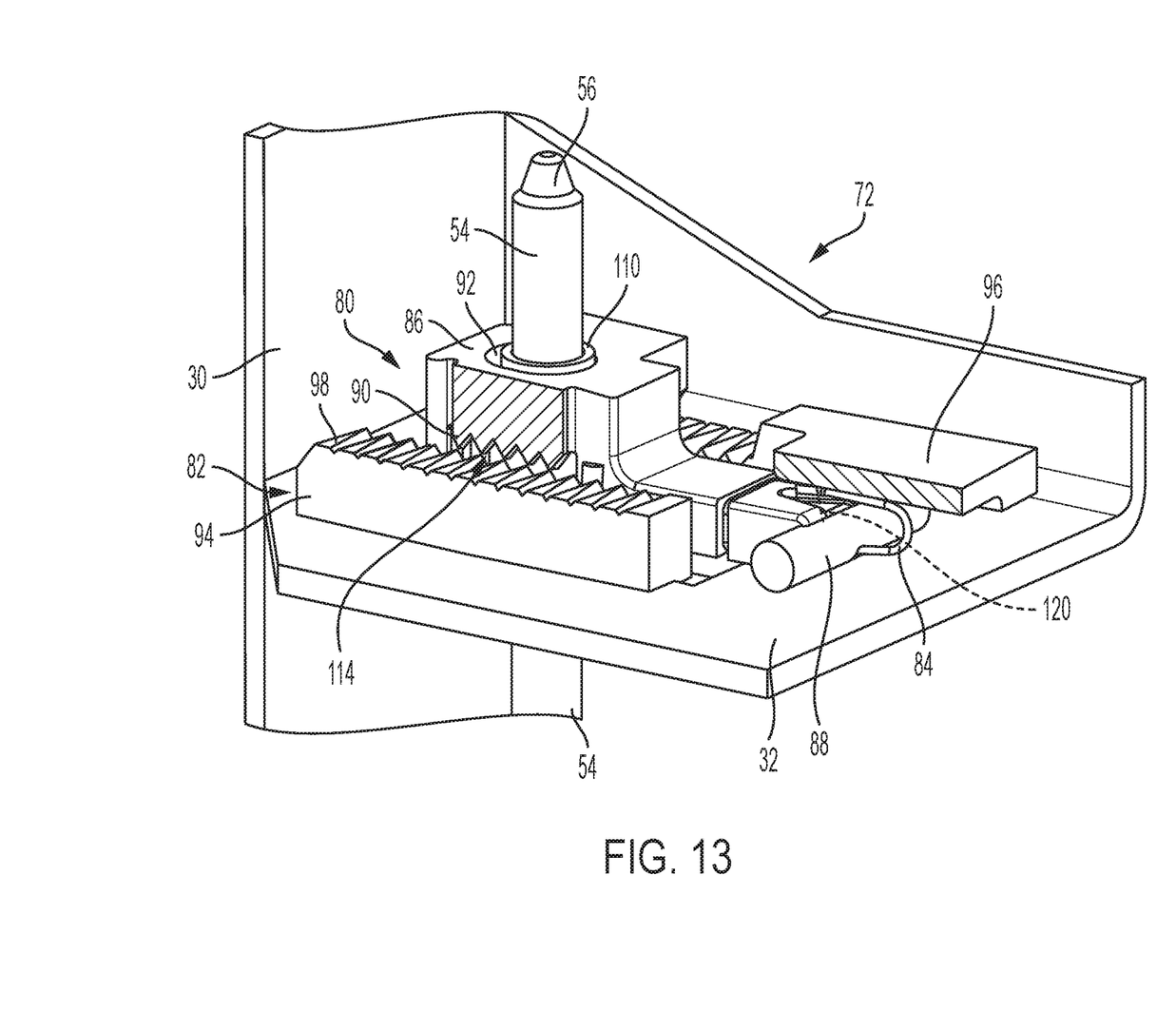
Figure 14:
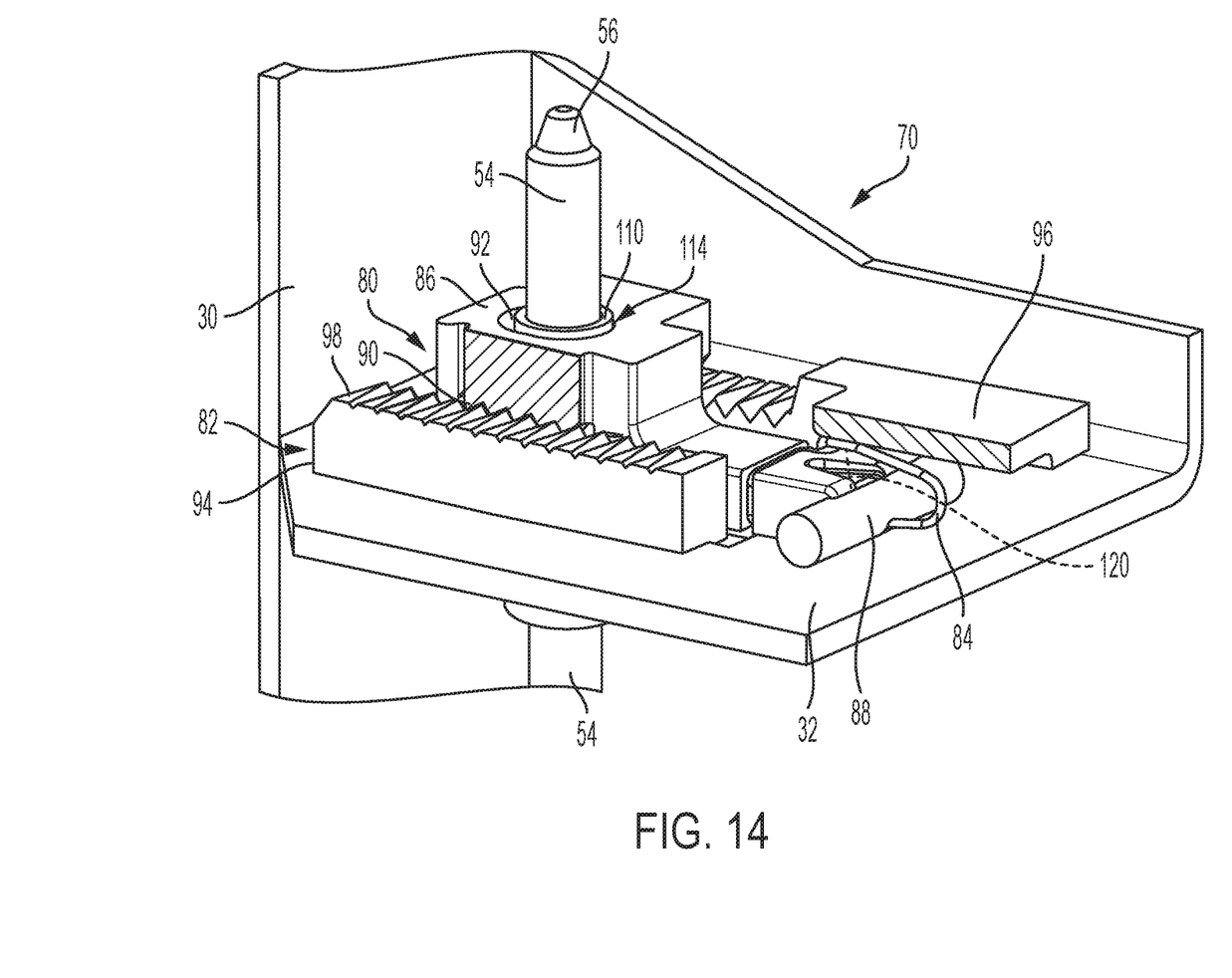

Referring to FIGS. 6-8, the spring loaded device 114 allows a degree of freedom to occur if one or more sets of the first plurality of teeth 90 of the first member 80 and the second plurality of teeth 98 second member 82 meet at their peaks so as to inhibit the entire tooth set from fully engaging also known as a stall event.

The spring loaded device 114 holds one end of at least one of the first member 80 and/or the second member 82 in a set position until the "tooth on tooth" stall event is about occur, whereby the spring loaded device 114 enables at least one of the first member 80 and the second member 82 to rotate, pivot, or rock about an arcuate path or an axis dynamically defined by interaction between the first biasing member 84 and the first plurality of teeth 90 and second plurality of teeth 98, relative to the other of the at least one of the first member 80 and the second member 82, allowing opposing teeth to roll/slide past one another, enabling full tooth engagement.

The locking assembly 20 of the present disclosure may eliminate the need for perfect pitch between teeth of the first member 80 and the second member 82. The locking assembly 20 of the present disclosure may desensitize tooth tip quality between teeth of the first member 80 and the second member 82.

The locking assembly of the present disclosure provides multiple areas of managed compliance. The pivot axis 14 of the locking assembly orientation may be adjusted.

Referring to FIGS. 9-14, the locking assembly 20 may employ a first biasing member 84 that disengages and manages a compliance axis 120. The locking assembly 20 may utilize a biasing member and a fastener (not shown) to simplify the arrangement. The compliance axis 120 allows for the rocking or pivoting of at least one the first member 80 and the second member 82 and may be converted to a straight axis or straight line. The compliance axis 120 also keeps the first member 80 and second member 82 from misaligning during the rocking or pivoting along its axis. Furthermore, the teeth of at least one of the first member 80 and the second member 82 may employ a non-symmetric pattern (not shown) that may improve the holding capacity of the locking assembly.

Referring to FIGS. 7-14, the movement and progression of the locking assembly is shown. In a fully locked position the first plurality of teeth 90 of the first member 80 are shown fully engaged with the second plurality of teeth 98 of the second member 82 (See FIGS. 7-9). The operator of the vehicle then moves the adjustment lever 60 (See FIG. 1) from the lock position towards the unlock position to adjust a position of the steering wheel connected to the jacket assembly 18 (See FIGS. 10 and 11). During adjustment the spring loaded device 114 holds the first member first portion 86 and the second member first portion 94 in a set position until the opposing teeth of the first member 80 and the second member 82 are able to fully engage once again. The operator then attempts to move the adjustment lever 60 back into the lock position however the first plurality of teeth 90 of the first member 80 and the second plurality of teeth 98 of the second member 82 meet at their peaks. Such a condition inhibits the entire tooth set from fully engaging, thereby causing a stall event (See FIG. 12). The stall event causes the first biasing member 84 to disengage the teeth of the first member 80 from the teeth of the second member 82 by moving along the compliance axis 120 (See FIG. 13). This disengagement enables at least one of the first member 80 and the second member 82 to rotate, pivot, or rock about an arcuate path or an axis. The axis is dynamically defined by interaction between the first biasing member 84 and the first plurality of teeth 90 and second plurality of teeth 98, relative to the other of the at least one of the first member 80 and the second member 82, allowing opposing teeth to roll/slide past one another, enabling full tooth engagement (See FIG. 14) once again.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

Having thus described the present disclosure, it is claimed:

1. A steering column assembly comprising:
   a mounting bracket;
   a jacket assembly operatively connected to the mounting bracket, the jacket assembly being movable relative to a steering column axis;
   a locking assembly operatively connected to at least one of the jacket assembly and the mounting bracket, the locking assembly comprising a first member defining a first plurality of teeth and a second member defining a second plurality of teeth, at least one of the first member and the second member pivotable along an arcuate path relative to the other of the first member and the second member during movement of the locking assembly from an unlock position to a lock position; and
   a first biasing member that disengages the first member from the second member and manages a compliance axis between the teeth of the first member and teeth of the second member, wherein the locking assembly further comprises a spring loaded device that extends at least partially through the first member and the second member, wherein the spring loaded device allows a degree of freedom to occur if one or more sets of opposing teeth of the first member and the second member are unable to fully engage.

2. The steering column assembly of claim 1, wherein the spring loaded device facilitates spacing the first plurality of teeth apart from the second plurality of teeth while the locking assembly moves from the unlock position to the lock position.

3. The steering column assembly of claim 1, wherein the spring loaded devices consists of a disengagement member which extends through the first member and the second member, and a second biasing member that is operatively connected to the disengagement member.

4. The steering column assembly of claim 1, wherein the mounting bracket includes a mounting bracket body, a first arm, and a second arm, the first arm defining a first opening that extends at least partially through the first arm, the second arm defining a second opening that extends at least partially through the second arm.

5. The steering column assembly of claim 4, wherein the locking assembly is disposed on the first arm of the mounting bracket and at least partially extends into the first opening of the first arm of the mounting bracket.

6. The steering column assembly of claim 1, wherein the second member includes a second member first portion and a second member second portion, the second member first portion defining the second plurality of teeth.

7. The steering column assembly of claim 6, wherein the second member is disposed in an opposing relationship with the first plurality of teeth of the first member such that the second plurality of teeth of the second member selectively engage the first plurality of teeth of the first member, the second member second portion extending from the second member first portion, the second member second portion extends into the first member.

8. A steering column assembly comprising:
   a mounting bracket;
   a jacket assembly operatively connected to the mounting bracket, the jacket assembly being movable relative to a steering column axis;
   a locking assembly operatively connected to at least one of the jacket assembly and the mounting bracket, the locking assembly comprising a first member defining a first plurality of teeth and a second member defining a second plurality of teeth, at least one of the first member and the second member pivotable along an arcuate path relative to the other of the first member and the second member during movement of the locking assembly from an unlock position to a lock position; and
   a first biasing member that disengages the first member from the second member and manages a compliance axis between the teeth of the first member and teeth of the second member, wherein the locking assembly further comprises a spring loaded device that extends at least partially through the first member and the second member, wherein the spring loaded device holds one end of at least one of the first member and the second member in a set position until the opposing teeth of the first member and the second member are able to fully engage.

9. A steering column assembly comprising:
a mounting bracket;
a jacket assembly operatively connected to the mounting bracket, the jacket assembly being movable relative to a steering column axis;
a locking assembly operatively connected to at least one of the jacket assembly and the mounting bracket, the locking assembly comprising a first member defining a first plurality of teeth and a second member defining a second plurality of teeth, at least one of the first member and the second member pivotable along an arcuate path relative to the other of the first member and the second member during movement of the locking assembly from an unlock position to a lock position; and
a first biasing member that disengages the first member from the second member and manages a compliance axis between the teeth of the first member and teeth of the second member, wherein an adjustment lever is pivotally connected to at least one of the mounting bracket and the jacket assembly by a rake bolt, wherein the first member includes a first member first portion and a first member second portion, the first member first portion defining the first plurality of teeth, and an opening through which the rake bolt passes through, the first member second portion extending from the first member first portion, wherein the first biasing member extends into a portion of the first member second portion.

10. The steering column assembly of claim 9, wherein the adjustment lever is rotatable between the lock position and the unlock position about a longitudinal axis of the rake bolt, an operator of a vehicle able to move the adjustment lever from the lock position towards the unlock position to adjust a position of a steering wheel connected to the jacket assembly.

11. The steering column assembly of claim 9, wherein the locking assembly is arranged to transition between the unlocked position and the locked position, responsive to movement of the adjustment lever.

12. The steering column assembly of claim 9, wherein the first biasing member is disposed about or operatively connected to the first member second portion.

13. A steering column assembly comprising:
a mounting bracket;
a jacket assembly operatively connected to the mounting bracket, the jacket assembly being movable relative to a steering column axis;
a locking assembly operatively connected to at least one of the jacket assembly and the mounting bracket, the locking assembly comprising a first member defining a first plurality of teeth and a second member defining a second plurality of teeth, at least one of the first member and the second member pivotable along an arcuate path relative to the other of the first member and the second member during movement of the locking assembly from an unlock position to a lock position;
a first biasing member that disengages the first member from the second member and manages a compliance axis between the teeth of the first member and teeth of the second member; and
a spring loaded device that extends at least partially through the first member and the second member, wherein the spring loaded devices consists of a disengagement member which extends through the first member and the second member, and a second biasing member that is operatively connected to the disengagement member.

14. The steering column assembly of claim 13, wherein the spring loaded device facilitates spacing the first plurality of teeth apart from the second plurality of teeth while the locking assembly moves from the unlock position to the lock position.

15. A steering column assembly comprising:
a mounting bracket;
a jacket assembly operatively connected to the mounting bracket, the jacket assembly being movable relative to a steering column axis;
a locking assembly operatively connected to at least one of the jacket assembly and the mounting bracket, the locking assembly comprising a first member defining a first plurality of teeth and a second member defining a second plurality of teeth, at least one of the first member and the second member pivotable along an arcuate path relative to the other of the first member and the second member during movement of the locking assembly from an unlock position to a lock position;
a first biasing member that disengages the first member from the second member and manages a compliance axis between the teeth of the first member and teeth of the second member; and
a spring loaded device that extends at least partially through the first member and the second member, wherein the spring loaded device allows a degree of freedom to occur if one or more sets of opposing teeth of the first member and the second member are unable to fully engage, and holds one end of at least one of the first member and the second member in a set position until the opposing teeth of the first member and the second member are able to fully engage.

* * * * *